US012307865B2

(12) United States Patent
Ewing et al.

(10) Patent No.: US 12,307,865 B2
(45) **Date of Patent: *May 20, 2025**

(54) ANTI-THEFT DEVICE WITH REMOTE ALARM FEATURE

(71) Applicant: Fasteners for Retail, Inc., Twinsburg, OH (US)

(72) Inventors: Brent O. Ewing, Roscoe, IL (US); Chan Chor Man, Tai Po (HK); Thomas O. Nagel, Rockford, IL (US)

(73) Assignee: Fasteners for Retail, Inc., Twinsburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,233

(22) Filed: Feb. 6, 2023

(65) Prior Publication Data

US 2023/0186740 A1 Jun. 15, 2023

Related U.S. Application Data

(63) Continuation of application No. 17/107,064, filed on Nov. 30, 2020, now Pat. No. 11,605,276, which is a (Continued)

(51) Int. Cl.

*G08B 13/189* (2006.01)
*G08B 13/14* (2006.01)
*G08B 13/24* (2006.01)

(52) U.S. Cl.

CPC ..... *G08B 13/1895* (2013.01); *G08B 13/1436* (2013.01); *G08B 13/2448* (2013.01); *G08B 13/248* (2013.01)

(58) Field of Classification Search

CPC ........................ G08B 13/2448; E05B 73/0017

(Continued)

(56) References Cited

U.S. PATENT DOCUMENTS 1,922,989 A 8/1933 Terry
2,358,658 A 9/1944 Riche et al.

(Continued)

FOREIGN PATENT DOCUMENTS

CA 3054574 A1 8/2018
CN 102124178 A 7/2011

(Continued)

OTHER PUBLICATIONS

POS Tuning—für mehr Erfolg am Point of Sale: POS T-Product Pusher; http://www.postuning.de/69.0.html?&L=2; website; Mar. 29, 2006; 1 page.

(Continued)

*Primary Examiner* — Fabricio R Murillo Garcia
(74) *Attorney, Agent, or Firm* — Reinhart Boerner Van Deuren P.C.

(57) ABSTRACT

An anti-theft device with a remote alarm feature is provided. The device is configured to attach to an item of retail merchandise and detect when a predetermined motion and light condition are met which together are indicative of a potential retail theft. Upon detection, the device is configured to generate a local alarm, and send a radio frequency to a remote device to generate an alarm at the remote device.

28 Claims, 7 Drawing Sheets

Related U.S. Application Data continuation of application No. 16/295,063, filed on Mar. 7, 2019, now Pat. No. 10,885,753.

(60) Provisional application No. 62/646,116, filed on Mar. 21, 2018.

(58) Field of Classification Search
USPC ........................................................ 340/568.1
See application file for complete search history.

(56) References Cited

U.S. PATENT DOCUMENTS

| | | | |
|---|---|---|---|
| 2,398,411 | A | 4/1946 | Cook |
| 2,954,128 | A | 9/1960 | Gordon |
| 2,996,593 | A | 8/1961 | McMains |
| 3,248,005 | A | 4/1966 | Joschko |
| 3,550,121 | A | 12/1970 | Porter, Jr. |
| 3,572,546 | A | 3/1971 | Schlaf |
| 3,706,309 | A | 12/1972 | Toftness |
| 3,773,217 | A | 11/1973 | Schlaf |
| 3,848,745 | A | 11/1974 | Smith |
| 3,852,735 | A | 12/1974 | Matsuda et al. |
| 3,983,341 | A | 9/1976 | Stanish |
| 4,001,805 | A | 1/1977 | Golbe |
| 4,020,305 | A | 4/1977 | Schwartz |
| 4,021,796 | A | 5/1977 | Fawcett, Jr. et al. |
| 4,122,437 | A | 10/1978 | Petersen |
| 4,166,273 | A | 8/1979 | Riley, Jr. et al. |
| 4,227,188 | A | 10/1980 | Petersen |
| 4,269,025 | A | 5/1981 | Kondo |
| 4,289,242 | A | 9/1981 | Kenyon |
| 4,311,889 | A | 1/1982 | Blanchard et al. |
| 4,312,460 | A | 1/1982 | Boettcher |
| 4,352,170 | A | 9/1982 | Jetter |
| 4,352,171 | A | 9/1982 | Jetter |
| 4,370,069 | A | 1/1983 | Nomura |
| 4,383,242 | A | 5/1983 | Sassover et al. |
| 4,384,906 | A | 5/1983 | Molinari et al. |
| 4,462,023 | A | 7/1984 | Nielsen et al. |
| 4,470,236 | A | 9/1984 | MacDonald, Jr. |
| 4,475,658 | A | 10/1984 | Roberts |
| 4,566,598 | A | 1/1986 | Fors |
| 4,600,119 | A | 7/1986 | Olson |
| 4,638,922 | A | 1/1987 | Stoltz |
| 4,675,654 | A | 6/1987 | Copeland |
| 4,706,821 | A | 11/1987 | Kohls et al. |
| 4,712,694 | A | 12/1987 | Breslow |
| 4,718,626 | A | 1/1988 | Thalenfeld et al. |
| 4,742,923 | A | 5/1988 | Calvert |
| 4,821,894 | A | 4/1989 | Dechirot |
| D300,994 | S | 5/1989 | Wolff |
| 4,830,201 | A | 5/1989 | Breslow |
| 4,836,390 | A | 6/1989 | Polvere |
| 4,870,228 | A | 9/1989 | Speer et al. |
| 4,887,737 | A | 12/1989 | Adenau |
| 4,899,668 | A | 2/1990 | Valiulis |
| 4,901,869 | A | 2/1990 | Hawkinson et al. |
| 4,942,386 | A | 7/1990 | Willis |
| 4,944,414 | A | 7/1990 | Albright |
| 4,962,367 | A | 10/1990 | Tymn |
| 4,967,044 | A | 10/1990 | Speer et al. |
| 4,996,515 | A | 2/1991 | Schaffer et al. |
| 5,009,334 | A | 4/1991 | Bodkins |
| 5,068,643 | A | 11/1991 | Yashina |
| 5,070,986 | A | 12/1991 | Hoffman et al. |
| 5,083,638 | A | 1/1992 | Schneider |
| 5,086,641 | A | 2/1992 | Roselli |
| 5,114,021 | A | 5/1992 | Fredrickson |
| 5,161,704 | A | 11/1992 | Valiulis |
| 5,168,263 | A | 12/1992 | Drucker |
| 5,222,608 | A | 6/1993 | Eklof et al. |
| 5,240,126 | A | 8/1993 | Foster et al. |
| 5,255,182 | A | 10/1993 | Adams |
| 5,265,738 | A | 11/1993 | Yablans et al. |
| 5,307,941 | A | 5/1994 | Siegal |
| 5,317,304 | A | 5/1994 | Choi |
| 5,335,892 | A | 8/1994 | Busch |
| 5,397,856 | A | 3/1995 | Lee |
| 5,434,559 | A | 7/1995 | Smiley et al. |
| 5,469,135 | A | 11/1995 | Solow |
| 5,570,080 | A | 10/1996 | Inoue et al. |
| 5,610,337 | A | 3/1997 | Nelson |
| 5,641,077 | A | 6/1997 | Tufano et al. |
| 5,649,641 | A | 7/1997 | Campoli |
| 5,671,851 | A | 9/1997 | Johnson et al. |
| 5,685,664 | A | 11/1997 | Parham et al. |
| 5,690,238 | A | 11/1997 | Schmehr |
| 5,730,320 | A | 3/1998 | David |
| 5,748,082 | A | 5/1998 | Payne |
| 5,757,270 | A | 5/1998 | Mori |
| 5,815,066 | A | 9/1998 | Pumilia |
| 5,838,225 | A | 11/1998 | Todd |
| 5,839,588 | A | 11/1998 | Hawkinson |
| 5,855,282 | A | 1/1999 | Hardy |
| 5,905,438 | A | 5/1999 | Weiss et al. |
| 5,906,283 | A | 5/1999 | Kump et al. |
| 5,955,951 | A | 9/1999 | Wischerop et al. |
| 5,965,954 | A | 10/1999 | Johnson et al. |
| 5,971,173 | A | 10/1999 | Valiulis et al. |
| 5,977,654 | A | 11/1999 | Johnson et al. |
| 5,979,674 | A | 11/1999 | Thalenfeld |
| 5,995,003 | A | 11/1999 | Rogers |
| 6,041,720 | A | 3/2000 | Hardy |
| 6,049,268 | A | 4/2000 | Flick |
| 6,082,558 | A | 7/2000 | Battaglia |
| 6,102,192 | A | 8/2000 | Tomuro et al. |
| 6,105,791 | A | 8/2000 | Chalson et al. |
| 6,109,458 | A | 8/2000 | Walsh et al. |
| 6,129,218 | A | 10/2000 | Henry et al. |
| 6,131,748 | A | 10/2000 | Kawasaki et al. |
| 6,133,830 | A | 10/2000 | D'Angelo et al. |
| 6,158,598 | A | 12/2000 | Josefsson |
| 6,269,285 | B1 | 7/2001 | Mignault |
| 6,279,256 | B1 | 8/2001 | Norolof et al. |
| 6,286,690 | B1 | 9/2001 | Thalenfeld |
| 6,373,381 | B2 | 4/2002 | Wu |
| 6,409,028 | B2 | 6/2002 | Nickerson |
| 6,418,797 | B1 | 7/2002 | Ambrosina et al. |
| 6,474,478 | B1 | 11/2002 | Huehner et al. |
| 6,517,000 | B1 | 2/2003 | McAllister et al. |
| D472,331 | S | 3/2003 | Zadak |
| 6,539,280 | B1 | 3/2003 | Valiulis et al. |
| 6,628,344 | B1 | 9/2003 | Weber |
| D480,231 | S | 10/2003 | Valiulis et al. |
| 6,659,291 | B2 | 12/2003 | Huehner et al. |
| 6,690,411 | B2 | 2/2004 | Naidoo et al. |
| 6,769,552 | B1 | 8/2004 | Thalenfeld |
| 6,820,754 | B2 | 11/2004 | Ondrasik |
| 6,824,009 | B2 | 11/2004 | Hardy |
| 6,874,684 | B1 | 4/2005 | Denenberg et al. |
| 6,886,699 | B2 | 5/2005 | Johnson et al. |
| 6,889,854 | B2 | 5/2005 | Burke |
| 6,923,330 | B1 | 8/2005 | Nagel |
| 6,964,235 | B2 | 11/2005 | Hardy |
| 6,967,578 | B1 | 11/2005 | Guida |
| 7,007,810 | B2 | 3/2006 | Huehner et al. |
| 7,017,778 | B2 | 3/2006 | Halbherr |
| 7,018,180 | B2 | 3/2006 | Koo |
| 7,059,518 | B2 | 6/2006 | Forster |
| 7,137,513 | B2 | 11/2006 | Sedon et al. |
| 7,174,176 | B1 | 2/2007 | Liu |
| 7,178,678 | B2 | 2/2007 | Mansfield et al. |
| 7,202,784 | B1 | 4/2007 | Herwig |
| 7,210,164 | B1 | 4/2007 | Jandrell |
| 7,258,461 | B1 | 8/2007 | Izardel |
| 7,287,669 | B2 | 10/2007 | Takeda |
| 7,293,663 | B2 | 11/2007 | Lavery, Jr. |
| 7,347,335 | B2 | 3/2008 | Rankin, VI et al. |
| 7,377,402 | B2 | 5/2008 | Takeda |
| 7,395,938 | B2 | 7/2008 | Merit et al. |
| 7,530,188 | B2 | 5/2009 | Beilenhoff et al. |
| 7,533,784 | B2 | 5/2009 | Vlastakis et al. |
| 7,559,437 | B2 | 7/2009 | Colelli et al. |
| 7,566,037 | B2 | 7/2009 | Vogler |

(56) References Cited

U.S. PATENT DOCUMENTS

| | | | |
|---|---|---|---|
| 7,584,930 | B2 | 9/2009 | Zich |
| 7,591,422 | B2 | 9/2009 | Maitin |
| 7,591,442 | B2 | 9/2009 | Dinh et al. |
| 7,671,741 | B2 | 3/2010 | Lax et al. |
| 7,671,742 | B2 | 3/2010 | Fallin et al. |
| 7,749,121 | B2 | 7/2010 | Perng |
| 7,768,399 | B2 | 8/2010 | Hachmann et al. |
| 7,792,711 | B2 | 9/2010 | Swafford, Jr. et al. |
| 7,828,158 | B2 | 11/2010 | Colelli et al. |
| 7,905,364 | B2 | 3/2011 | Pail |
| 7,916,020 | B2 | 3/2011 | Seidel |
| 7,969,305 | B2 | 6/2011 | Belden, Jr. et al. |
| 8,016,128 | B2 | 9/2011 | Valiulis et al. |
| 8,069,994 | B2 | 12/2011 | Barkdoll |
| 8,103,047 | B1 | 1/2012 | Griess et al. |
| 8,139,945 | B1 | 3/2012 | Amir et al. |
| 8,190,289 | B2 | 5/2012 | Lockwood et al. |
| 8,240,486 | B2 | 8/2012 | Niederhuefner et al. |
| 8,260,456 | B2 | 9/2012 | Siegel et al. |
| 8,274,391 | B2 | 9/2012 | Yang |
| 8,276,766 | B2 | 10/2012 | Rataiczak, III et al. |
| 8,328,027 | B2 | 12/2012 | Barkdoll |
| 8,360,253 | B2 | 1/2013 | Hardy |
| 8,368,542 | B2 | 2/2013 | Yang |
| 8,373,564 | B2 | 2/2013 | Wyatt, Jr. et al. |
| 8,378,826 | B2 | 2/2013 | Mercier et al. |
| 8,386,075 | B2 | 2/2013 | Lockwood et al. |
| 8,443,988 | B2 | 5/2013 | Niederhuefner |
| 8,534,469 | B2 | 9/2013 | Northrup, Jr. et al. |
| 8,629,772 | B2 | 1/2014 | Valiulis et al. |
| 8,720,702 | B2 | 5/2014 | Nagel |
| 8,803,687 | B2 | 8/2014 | Valiulis et al. |
| 8,812,378 | B2 | 8/2014 | Swafford, Jr. et al. |
| 8,823,521 | B2 | 9/2014 | Overhultz et al. |
| 8,884,761 | B2 | 11/2014 | Valiulis |
| 8,941,495 | B2 | 1/2015 | Wiese et al. |
| 9,009,773 | B1 | 4/2015 | Hendricks et al. |
| 9,129,494 | B2 | 9/2015 | Valiulis et al. |
| 9,167,916 | B2 | 10/2015 | Grant et al. |
| 9,241,583 | B2 | 1/2016 | Nagel |
| 9,254,049 | B2 | 2/2016 | Nagel |
| 9,318,007 | B2 | 4/2016 | Valiulis et al. |
| 9,318,008 | B2 | 4/2016 | Valiulis et al. |
| 9,324,220 | B2 | 4/2016 | Valiulis |
| 9,437,736 | B2 | 9/2016 | Taniguchi et al. |
| 9,483,896 | B2 | 11/2016 | Lockwood et al. |
| 9,495,856 | B2 | 11/2016 | Brenner |
| 9,576,417 | B2 | 2/2017 | Christianson |
| 9,805,334 | B2 | 10/2017 | Overhultz et al. |
| 9,805,539 | B2 | 10/2017 | Swafford, Jr. et al. |
| 9,818,081 | B2 | 11/2017 | Khalid et al. |
| 10,121,341 | B2 | 11/2018 | Ewing et al. |
| 10,271,666 | B2 | 4/2019 | Taylor et al. |
| 10,357,118 | B2 | 7/2019 | Swafford |
| 10,535,216 | B2 | 1/2020 | Swafford, Jr. et al. |
| 10,720,035 | B2 | 7/2020 | Ewing et al. |
| 10,885,753 | B2 | 1/2021 | Ewing et al. |
| 10,993,550 | B2 | 5/2021 | Ewing et al. |
| 11,154,143 | B2 | 10/2021 | Ewing et al. |
| 11,317,738 | B2 | 5/2022 | Ewing et al. |
| 11,363,894 | B2 | 6/2022 | Ewing et al. |
| 11,412,863 | B2 | 8/2022 | Grant et al. |
| 11,605,276 | B2 | 3/2023 | Ewing et al. |
| 2001/0002210 | A1 | 5/2001 | Petite |
| 2001/0004239 | A1* | 6/2001 | Irizarry .............. G08B 13/2431 340/568.1 |
| 2001/0044751 | A1 | 11/2001 | Pugliese, III et al. |
| 2002/0004690 | A1 | 1/2002 | Paulucci et al. |
| 2002/0067259 | A1 | 6/2002 | Fufidio et al. |
| 2002/0108916 | A1 | 8/2002 | Nickerson |
| 2002/0130776 | A1 | 9/2002 | Houde |
| 2002/0188866 | A1 | 12/2002 | Jalaludeen et al. |
| 2003/0004784 | A1 | 1/2003 | Li et al. |
| 2003/0029816 | A1 | 2/2003 | Huehner et al. |
| 2003/0030548 | A1 | 2/2003 | Kovacs et al. |
| 2003/0057167 | A1 | 3/2003 | Johnson et al. |
| 2003/0175004 | A1 | 9/2003 | Garito et al. |
| 2003/0227382 | A1 | 12/2003 | Breed |
| 2004/0034581 | A1 | 2/2004 | Hill et al. |
| 2004/0053044 | A1 | 3/2004 | Moreno et al. |
| 2004/0073334 | A1 | 4/2004 | Terranova |
| 2004/0084386 | A1 | 5/2004 | Huehner et al. |
| 2004/0124201 | A1 | 7/2004 | Hieb |
| 2004/0145477 | A1 | 7/2004 | Easter et al. |
| 2004/0195319 | A1 | 10/2004 | Forster |
| 2005/0029283 | A1 | 2/2005 | Pedigo |
| 2005/0040123 | A1 | 2/2005 | Ali |
| 2005/0056602 | A1 | 3/2005 | Hardy |
| 2005/0098626 | A1 | 5/2005 | Jordan et al. |
| 2005/0104733 | A1 | 5/2005 | Campero |
| 2005/0161420 | A1 | 7/2005 | Hardy et al. |
| 2005/0168345 | A1 | 8/2005 | Swafford, Jr. et al. |
| 2005/0189309 | A1 | 9/2005 | Hardy |
| 2005/0189369 | A1 | 9/2005 | Vlastakis et al. |
| 2005/0261816 | A1 | 11/2005 | DiCroce et al. |
| 2005/0279722 | A1 | 12/2005 | Ali |
| 2005/0288708 | A1 | 12/2005 | Kammerer et al. |
| 2006/0049122 | A1 | 3/2006 | Mueller et al. |
| 2006/0068144 | A1 | 3/2006 | Mizuno et al. |
| 2006/0163180 | A1 | 7/2006 | Rankin, VI et al. |
| 2006/0163272 | A1 | 7/2006 | Gamble |
| 2006/0198611 | A1 | 9/2006 | Park |
| 2006/0219517 | A1 | 10/2006 | Cheng et al. |
| 2006/0226095 | A1 | 10/2006 | Hardy |
| 2006/0240398 | A1 | 10/2006 | Hardy et al. |
| 2007/0050271 | A1 | 3/2007 | Ufford et al. |
| 2007/0080123 | A1 | 4/2007 | Mason |
| 2007/0080806 | A1 | 4/2007 | Lax et al. |
| 2007/0095903 | A1 | 5/2007 | Suenbuel |
| 2007/0108142 | A1 | 5/2007 | Medcalf et al. |
| 2007/0115100 | A1 | 5/2007 | Mandie |
| 2007/0171059 | A1 | 7/2007 | Pistilli |
| 2007/0251900 | A1 | 11/2007 | Hardy |
| 2007/0265866 | A1 | 11/2007 | Fehling |
| 2007/0267364 | A1 | 11/2007 | Barkdoll |
| 2007/0267367 | A1 | 11/2007 | Mueller et al. |
| 2007/0273513 | A1 | 11/2007 | White |
| 2008/0015956 | A1 | 1/2008 | Regard |
| 2008/0203253 | A1 | 8/2008 | Vogler |
| 2008/0307687 | A1 | 12/2008 | Nagel et al. |
| 2008/0309489 | A1 | 12/2008 | Hachmann et al. |
| 2009/0006196 | A1 | 1/2009 | Barkan et al. |
| 2009/0079557 | A1 | 3/2009 | Miner |
| 2009/0091448 | A1 | 4/2009 | Leyden et al. |
| 2009/0095695 | A1 | 4/2009 | Moock et al. |
| 2009/0101606 | A1 | 4/2009 | Olson |
| 2009/0109027 | A1 | 4/2009 | Schuller |
| 2009/0174566 | A1 | 7/2009 | Volk et al. |
| 2009/0248198 | A1 | 10/2009 | Siegel et al. |
| 2009/0308494 | A1 | 12/2009 | Linn |
| 2010/0012602 | A1 | 1/2010 | Valiulis et al. |
| 2010/0013603 | A1 | 1/2010 | Chatani et al. |
| 2010/0097223 | A1 | 4/2010 | Kruest et al. |
| 2010/0175438 | A1 | 7/2010 | Sankey |
| 2010/0200526 | A1 | 8/2010 | Barkdoll |
| 2010/0237093 | A1 | 9/2010 | Lockwood et al. |
| 2010/0238031 | A1 | 9/2010 | Belden, Jr. et al. |
| 2010/0268792 | A1 | 10/2010 | Butler et al. |
| 2011/0055103 | A1 | 3/2011 | Swafford, Jr. et al. |
| 2011/0062794 | A1 | 3/2011 | Vergoossen et al. |
| 2011/0068921 | A1 | 3/2011 | Shafer |
| 2011/0094975 | A1 | 4/2011 | Hardy |
| 2011/0127225 | A1 | 6/2011 | Hooks, Jr. et al. |
| 2011/0168652 | A1 | 7/2011 | Barkdoll |
| 2011/0215060 | A1 | 9/2011 | Niederhuefner |
| 2011/0218889 | A1 | 9/2011 | Westberg et al. |
| 2011/0227735 | A1 | 9/2011 | Fawcett et al. |
| 2011/0282768 | A1 | 11/2011 | Swafford, Jr. et al. |
| 2011/0284571 | A1 | 11/2011 | Lockwood et al. |
| 2011/0310307 | A1 | 12/2011 | Takahashi |
| 2012/0006764 | A1 | 1/2012 | Hachmann et al. |
| 2012/0091162 | A1 | 4/2012 | Overhultz et al. |
| 2012/0120571 | A1 | 5/2012 | Bisesti et al. |
| 2012/0209426 | A1 | 8/2012 | Lockwood et al. |

(56) References Cited

U.S. PATENT DOCUMENTS

| | | | |
|---|---|---|---|
| 2012/0253508 | A1 | 10/2012 | Holmes |
| 2012/0287090 | A1 | 11/2012 | Cacioppo |
| 2012/0293330 | A1 | 11/2012 | Grant et al. |
| 2013/0002422 | A1 | 1/2013 | Wiese et al. |
| 2013/0024023 | A1 | 1/2013 | Siegel et al. |
| 2013/0057524 | A1 | 3/2013 | Bertin et al. |
| 2013/0106259 | A1 | 5/2013 | Lockwood et al. |
| 2013/0141240 | A1 | 6/2013 | Valiulis et al. |
| 2013/0142494 | A1 | 6/2013 | Valiulis et al. |
| 2013/0144433 | A1 | 6/2013 | Lockwood et al. |
| 2013/0247834 | A1 | 9/2013 | Kodat |
| 2013/0312644 | A1 | 11/2013 | Copeland |
| 2014/0055264 | A1 | 2/2014 | Valiulis et al. |
| 2014/0055266 | A1* | 2/2014 | Valiulis .............. G08B 13/1436 340/572.1 |
| 2014/0070948 | A1 | 3/2014 | Valiulis et al. |
| 2014/0191870 | A1* | 7/2014 | Valiulis .............. G08B 13/2448 340/572.1 |
| 2014/0197953 | A1* | 7/2014 | Valiulis ................. A47F 5/0823 340/568.8 |
| 2014/0352372 | A1 | 12/2014 | Grant et al. |
| 2015/0042178 | A1 | 2/2015 | Kim |
| 2015/0068991 | A1 | 3/2015 | Kostka |
| 2015/0096998 | A1 | 4/2015 | Bird et al. |
| 2015/0238026 | A1 | 8/2015 | Chambers |
| 2015/0321827 | A1 | 11/2015 | Lockwood et al. |
| 2015/0371482 | A1 | 12/2015 | Szpak et al. |
| 2016/0005282 | A1* | 1/2016 | Lax .................... G08B 13/2482 340/572.1 |
| 2016/0132822 | A1 | 5/2016 | Swafford |
| 2016/0180676 | A1* | 6/2016 | Slim .................. G08B 13/2494 340/541 |
| 2017/0202369 | A1 | 7/2017 | Mercier et al. |
| 2017/0303704 | A1 | 10/2017 | Taylor et al. |
| 2018/0047243 | A1 | 2/2018 | Swafford, Jr. et al. |
| 2018/0107973 | A1 | 4/2018 | Overhultz et al. |
| 2018/0365953 | A1 | 12/2018 | Ewing et al. |
| 2019/0019140 | A1 | 1/2019 | Costello et al. |
| 2019/0183259 | A1 | 6/2019 | Grant et al. |
| 2019/0206212 | A1* | 7/2019 | Forster ................ G02F 1/13718 |
| 2019/0272498 | A1 | 9/2019 | Swafford |
| 2019/0275498 | A1 | 9/2019 | Tanba et al. |
| 2019/0290020 | A1 | 9/2019 | Ewing et al. |
| 2019/0374048 | A1 | 12/2019 | Valiulis et al. |
| 2021/0001785 | A1 | 1/2021 | Rose |
| 2022/0000278 | A1 | 1/2022 | Ewing et al. |
| 2022/0202207 | A1 | 6/2022 | Ewing et al. |
| 2022/0240693 | A1 | 8/2022 | Ewing et al. |
| 2023/0059326 | A1 | 2/2023 | Ewing et al. |

FOREIGN PATENT DOCUMENTS

| | | | |
|---|---|---|---|
| CN | 102763184 | A | 10/2012 |
| CN | 103158757 | A | 6/2013 |
| CN | 103198387 | A | 7/2013 |
| CN | 204039597 | U | 12/2014 |
| CN | 104631970 | A | 5/2015 |
| CN | 204351457 | U | 5/2015 |
| CN | 104981825 | A | 10/2015 |
| CN | 107462171 | A | 12/2017 |
| CN | 107529899 | A | 1/2018 |
| CN | 108694540 | A | 10/2018 |
| CN | 207943567 | U | 10/2018 |
| DE | 202005010088 | U1 | 9/2005 |
| DE | 102011012163 | A1 | 8/2012 |
| EP | 0868871 | A1 | 10/1998 |
| EP | 1256296 | A2 | 11/2002 |
| EP | 1541064 | A1 | 6/2005 |
| EP | 1541064 | B1 | 2/2006 |
| EP | 2888723 | A1 | 7/2015 |
| EP | 2988281 | A1 | 2/2016 |
| GB | 2304102 | A | 3/1997 |
| GB | 2360514 | A | 9/2001 |
| KR | 100823026 | B1 | 4/2008 |
| KR | 20100137956 | A | 12/2010 |
| KR | 20110002261 | U | 3/2011 |
| KR | 20110043837 | A | 4/2011 |
| KR | 20110080411 | A | 7/2011 |
| NL | 1001794 | C2 | 6/1997 |
| WO | WO 9103967 | A1 | 4/1991 |
| WO | WO 9740724 | A1 | 11/1997 |
| WO | WO 9927824 | A1 | 6/1999 |
| WO | WO 0181988 | A2 | 11/2001 |
| WO | WO 2004/083051 | A2 | 9/2004 |
| WO | WO 2005/107535 | A1 | 11/2005 |
| WO | WO 2009/100857 | A1 | 8/2009 |
| WO | WO 2011/025085 | A1 | 3/2011 |
| WO | WO 2012/113536 | A1 | 8/2012 |
| WO | WO 2012/127849 | A1 | 9/2012 |
| WO | WO 2018/045038 | A1 | 3/2018 |

OTHER PUBLICATIONS

POS Tuning—für mehr Erfolg am Point of Sale: The POS T-Systemtray; http://www.postuning.de/68.0.hyml?L=2; website; Mar. 29, 2006; 1 page.

Indyme smartresponse; 2 pages printed from internet http://www.indyme.com/; date last visited Apr. 8, 2013.

U.S. Appl. No. 18/305,022, filed Apr. 21, 2023, Ewing et al.

U.S. Appl. No. 18/114,006, filed Feb. 24, 2023, Ewing et al.

U.S. Appl. No. 18/114,012, filed Feb. 24, 2023, Ewing et al.

* cited by examiner

ANTI-THEFT DEVICE WITH REMOTE ALARM FEATURE

CROSS-REFERENCE TO RELATED PATENT APPLICATION

This patent application is a continuation of U.S. patent application Ser. No. 17/107,064, filed Nov. 30, 2020, which is now pending, which is a continuation of U.S. patent application Ser. No. 16/295,063, filed Mar. 7, 2019, and issued as U.S. Pat. No. 10,885,753 on Jan. 5, 2021, which claims the benefit of U.S. Provisional Patent Application No. 62/646,116, filed Mar. 21, 2018, the entire teachings and disclosure of which are incorporated herein by reference thereto.

FIELD OF THE INVENTION

This invention generally relates to retail systems, and, more particularly, to theft detection systems for use in a retail environment.

BACKGROUND OF THE INVENTION

The retail industry looks to prevent loss due to theft. Therefore, many retail environments include theft deterrence systems. Some retail environments may provide an electronic article surveillance (EAS) system in which gates may be located proximate the exit to the retail environment. In such a system, a tag may be placed on merchandise, and if an EAS gate senses a tag passing through it, it sounds an alarm. Thus, the alarm is typically sounded only as the thief and the stolen merchandise are already leaving the retail environment.

Embodiments of the present invention provide a device to aid in the prevention of theft. These and other advantages of the invention, as well as additional inventive features, will be apparent from the description of the invention provided herein.

BRIEF SUMMARY OF THE INVENTION

In one aspect the invention provides a theft detection device. An embodiment of such a theft detection device includes a light sensor, a motion sensor, an emitter, an antenna configured to emit a wireless signal separately from the emitter, and a controller. The controller is configured to determine a light level sensed by the light sensor. The controller is also configured to determine, via the motion sensor, whether the theft detection device is in motion. The controller is configured to operate the antenna based on the sensed motion of the theft detection device and the light level sensed by the light sensor such that the wireless signal is transmitted by the antenna to an alarm box.

In an embodiment according to this aspect, the wireless signal is a wireless signal indicative of a potential theft condition.

In an embodiment according to this aspect, the controller is configured to operate the emitter based on the sensed motion of the theft detection device and the light level sensed by the light sensor such that a signal is generated by the emitter. The signal generated by the emitter is an audible tone. The controller is configured to operate the emitter and the antenna based on the sensed motion of the theft detection device and the light level sensed by the light sensor such that the signal is generated by the emitter and the wireless signal are transmitted by the antenna to the alarm box simultaneously.

In an embodiment according to this aspect, the controller is configured to recognize a signal from an EAS gate. The controller is configured to operate at least one of the emitter to generate the signal and the antenna to generate the wireless signal upon receiving the signal from the EAS gate.

In an embodiment according to this aspect, the controller is configured to recognize a signal from a activation/deactivation pad. The controller is configured to operate at least one of the emitter to discontinue producing the signal and the antenna to discontinue producing the wireless signal.

In another aspect, the invention provides a theft detection system. An embodiment of such a theft detection system includes at least one retail merchandise tag configured for attachment to an item of retail merchandise. The at least one retail merchandise tag is configured to detect a change in motion of the retail merchandise tag sensed by a motion sensor of the at least one retail merchandise tag, and a change in light sensed via a light sensor of the at least one retail merchandise tag which together are indicative of a potential retail theft condition. The system also includes an alarm box configured to receive a signal from the at least one retail merchandise tag. The signal received being at least one of an audible tone generated by an emitter of the at least one retail merchandise tag and a wireless signal generated by an antenna of the retail merchandise tag. The at least one retail merchandise tag and the alarm box are each operable to generate an alarm upon detection of the potential retail theft condition simultaneously.

In an embodiment according to this aspect, the signal includes a signal produced by an emitter of the retail merchandise tag and the Wireless signal produced by the antenna. The at least one retail merchandise tag includes a controller that is configured to operate the emitter and the antenna based on the sensed motion of the at least one retail merchandise tag and the light level sensed by the light sensor such that a signal is generated by the emitter. The signal generated by the emitter is an audible tone.

In an embodiment according to this aspect, the controller is configured to recognize a signal from an EAS gate. The controller is configured to operate at least one of the emitter to generate the signal and the antenna to generate the wireless signal upon receiving the signal from the EAS gate.

In an embodiment according to this aspect, the controller is configured to recognize a signal from an activation/deactivation pad. The controller is configured to operate at least one of the emitter to discontinue producing the signal and the antenna to discontinue producing the wireless signal.

In yet another aspect, the invention provides a method of detecting a potential retail theft and generating an alarm. An embodiment of such a method includes detecting motion of a retail merchandise tag using a motion sensor of the retail merchandise tag, detecting a light condition using a light sensor of the retail merchandise tag, determining whether the motion and the light condition are indicative of a potential retail theft using a microprocessor of the retail merchandise tag. Upon determination that the motion and the light condition are indicative of a potential retail theft, the method also includes generating an alarm at an alarm box remote from the retail merchandise tag.

In an embodiment according to this aspect, the method includes generating an alarm locally at the retail merchandise tag via an emitter of the retail merchandise tag. The alarm generated locally at the retail merchandise tag and remotely at the alarm box are generated simultaneously.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Generally, one embodiment of a theft detection device shown in the figures as a merchandise tag is provided. In retail stores, thieves may tend to take merchandise and place them into a bag, purse, or other enclosure, to hide the items. Low light levels around a such merchandise in conjunction with movement of the merchandise are indicative that the product may be being stolen. A merchandise tag according to the teachings herein may be coupled to a product and detect low light levels and movement to determine when a potential theft condition exists. When such a potential theft condition does exist, a merchandise tag according to the teachings herein may provide a localized alarm e.g., an audible tone, as well as send a signal to a remote device such as an alarm box situated for example with other store personnel remote from where the merchandise is located in the retail store. Upon receipt of this signal, the alarm box may in turn generate a remote alarm, e.g., an audible tone as well. The term "alarm" as used herein in this context means any signal capable of alerting store personnel of a potential retail theft.

Figure 1:
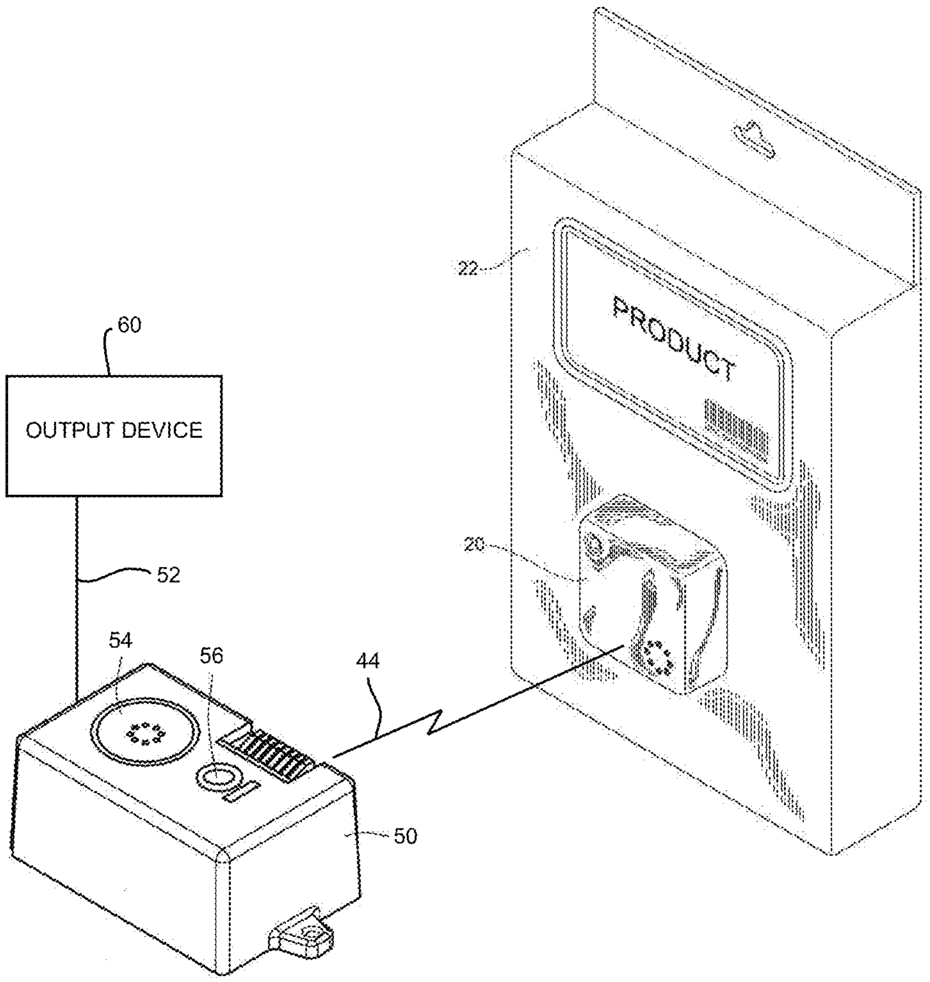
FIG. 1 is a perspective view of an embodiment of a theft detection device shown as a merchandise tag coupled to a product, such as a merchandise product.

With reference to FIG. 1, a theft detection device 20, in the form of a merchandise tag 20, is illustrated in the perspective view. With respect to embodiments of the invention described herein, the terms "theft protection device" and "merchandise tag" may be used interchangeably. The merchandise tag 20 is attached to a product, shown as a merchandise product 22. The merchandise tag 20 may be attached to any type of product to deter theft of the merchandise product. Additionally, the merchandise tag 20 may be coupled to any suitable surface of the merchandise product 22.

The retail theft deterrent system may further include one or more alarm boxes 50 each configured to communicate wirelessly merchandise tag 20. The alarm box 50 may in turn be configured to communicate with an output receiving device 60. As used herein, the term "communicate" means multi-direction communication, e.g., communicated from the merchandise tag 20 to the alarm box 50 as well as from alarm box 50 to merchandise tag 20.

The embodiment shown in FIG. 1 includes an output receiving device 60, which may be a computer or computer server configured to communicate, via wired or wireless means for example, with the alarm box 50. The output receiving device 60 may be a networked computer server configured to communicate over the internet or private intranet to remote computers or mobile electronic devices. It should be noted, however, that it is also envisioned that the system may only comprise one or more merchandise tag(s) 20 operable to communicate with one or more alarm boxes 50.

In further embodiments, the output receiving device 60 may include at least one of a portable computer, a pager, a cellular telephone, a public address system, computer memory, one or more video cameras, video monitors, and any other device capable of receiving the signal 52. As referenced above, the receiving device 60 may be connected to the alarm box 50 using wired or wireless means, and may be networked with other receiving devices located on or off site, or may be a stand-alone unit located locally or offsite relative to a retail establishment.

With such a system the merchandise tag(s) 20 may communicate directly with the alarm box 50 by sending a signal 44 thereto. Alternatively, merchandise tag(s) 20 may communicate first with any typical signal relay device (not shown) which in turn communicates signal 44 (or an equivalent reproduction thereof) to the alarm box 50. The system is designed to provide a local alarm at the point of a potential theft, as well as a remote alarm at the alarm box 50. This alarm may take on any form and in one typical example may be an audible tone.

With such a configuration, store personnel in proximity to the actual theft event will hear the tone and it will be possible to identify the location of the merchandise and the would-be thief. Additionally, the alarm generated at the alarm box 50 will alert store personnel remote from the potential theft event. This may be for example a cashier, a security officer, etc. To achieve this, the alarm box 50 includes an alarm emitter 54 which may take on any form similar or the same as that described herein relative to an emitter 26 (see FIG. 2) of the merchandise tag 20. Additionally, alarm box 50 may include one or more user controls 56 to allow for remote control of the entire system, the alarm box 50, or one or more merchandise tags 20.

While a single merchandise tag 20 is shown communicating with a single alarm box 50, the system is configured such that multiple merchandise tags 20 can communicate with a single alarm box 50. Further, it is also envisioned that a single merchandise tag 20 can communicate with multiple alarm boxes 50 simultaneously.

Figure 2:
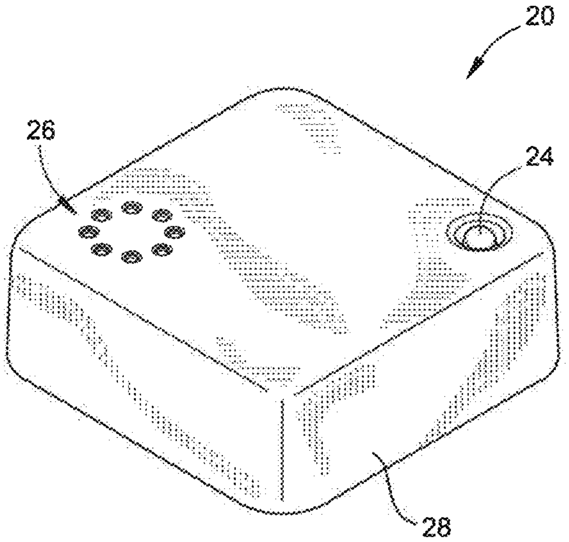
FIG. 2 is a top perspective view of the merchandise tag of FIG. 1.

As illustrated in the embodiment of FIG. 2, the merchandise tag 20 includes a light sensor 24 and an emitter 26. The light sensor 24 may be any suitable type of photocell, photo detector, photoresistor, light dependent resistor, or any other suitable type of light sensor. As will be discussed in more detail below, the emitter 26 to emit audible sound signals, infrared signals, visible light signals, while an antenna 46 (shown in FIG. 4) may emit and/or receive wireless signals which broadly speaking may be AM signals, FM signals, microwave signals, combinations thereof, or any other suitable type of wireless signal, using any known communication protocol, e.g., Wi-Fi, Bluetooth, cellular, conventional radio, etc.

The merchandise tag 20 also includes a housing 28. The housing 28 may include one or more tabs on a side panel adapter of the housing 28 to facilitate attachment of the merchandise tag 20 to various types of products 22. In particular embodiments, the housing 28 has a tab on each side panel adapter.

Figure 3:
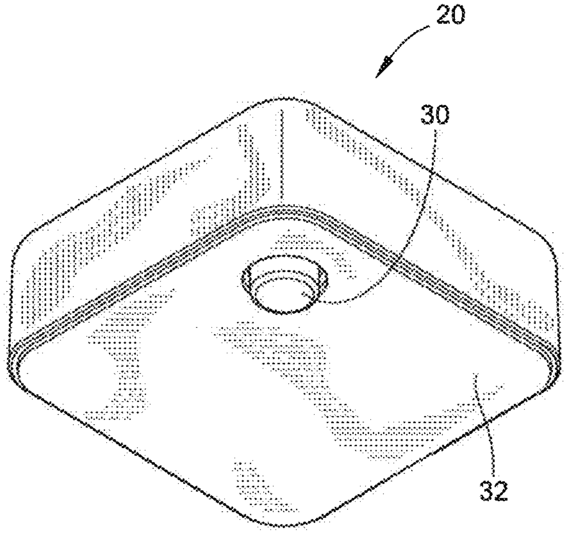
FIG. 3 is a bottom perspective view of the merchandise tag of FIGS. 1 and 2.

With reference to FIG. 3, in one embodiment, the merchandise tag 20 includes an activator, such as an activation button 30. The activation button 30 projects through an attachment portion 32 of the merchandise tag 20. The activation button 30 is configured to activate the merchandise tag 20 when actuated, which, in the illustrated embodiment, occurs when the button 30 is depressed. When the attachment portion 32 of the merchandise tag 20 is coupled to a merchandise product 22, the activation button 30 is depressed, activating the merchandise tag 20. In one embodiment, the attachment portion 32 includes adhesive to couple the merchandise tag 20 to a merchandise product. In alternate embodiments, the merchandise tag 20 is attached to a merchandise product by any other suitable mechanism (e.g., staple, tape, tie, etc.). In some embodiments, the merchandise tag 20 is configured to be permanently attached to the merchandise product 22. In other embodiments, the merchandise tag 20 is configured to be releasably or removably attached to the merchandise product 22.

Figure 4:
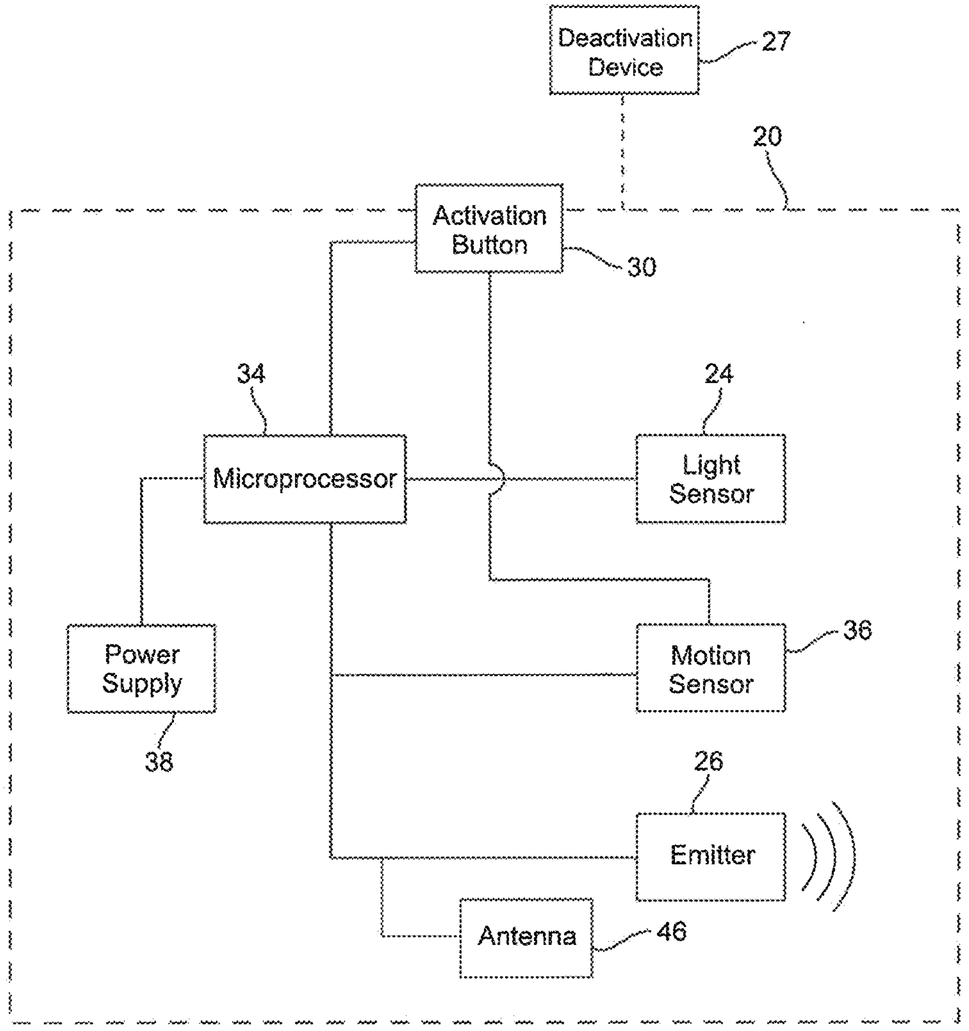
FIG. 4 is a block diagram of an embodiment of a merchandise tag, in accordance with an embodiment of the invention.

FIG. 4 is a schematic illustration of the merchandise tag 20 in accordance with an embodiment of the invention. The merchandise tag 20 includes a controller, illustrated in FIG. 4 as a microprocessor 34. The microprocessor 34 is electrically coupled to the light sensor 24 and to the emitter 26. In this embodiment, the merchandise tag 20 is also electrically coupled to a motion sensor 36. As will be described in more detail below, the microprocessor 34 is configured to determine from the light sensor 24 and motion sensor 36 when the merchandise tag 20, and thus the merchandise product 22 to which it is attached, is in low light and in motion, indicating a potential theft condition. While the particulars of how these sensors operate to identify a potential theft condition are discussed in greater detail below relative to FIGS. 5 and 6, these sensors may readily be configured to operate in the manner described in U.S. Pat. No. 9,324,220 to Valiulis titled "Theft Detection Device and Method For Controlling Same," the teachings and disclosure of which are incorporated by reference herein in their entirety.

The activation button 30 is configured to activate the motion sensor 36 when the activation button 30 is actuated. In one embodiment, the activation button 30 is also coupled to the microprocessor 34 which is configured to determine when the activation button 30 is in an actuated state or an unactuated state. Additionally, the microprocessor 34 is coupled to a power supply 38. The power supply 38 may be a battery, solar cell, or any other suitable power supply. It is further envisioned that some embodiments of the invention may include merchandise tags 20 having external power supplies 38. For example, the merchandise tag 20 may operate similarly to an RFID tag where radio signals received by the merchandise tag 20 supply the electrical power necessary to operate the tag 20. It is also envisioned that tag 20 may utilize RFID protocol to allow for tracking it throughout a store using a store's existing RFID tracking capabilities. In such an embodiment, tag 20 includes all the necessary hardware to emit an RFID signal, essentially communicating a serial number for tag 20 to various receivers throughout the store.

As referenced above, in certain embodiments, the merchandise tags 20 is configured with an antenna 46 allowing the tag 20 to transmit wireless signals, such as Wireless signals 44 (see FIG. 1). The transmission of these signals to the alarm box 50 of FIG. 1 will indicate when the microprocessor 34 of the merchandise tag 20 senses a condition that would indicate a potential theft condition.

In operation, Wireless signals 44 emitted by the merchandise tag 20 are received by the alarm box 50. The alarm box 50 is configured to receive and process these Wireless signals 44, which may include a variety of information, such as the identification of the particular merchandise tag 20 from which the signal 44 was emitted, an identification of whether an item of merchandise has been removed, a location within the retail establishment from where the Wireless signal 44 is being emitted, and that a potential theft condition exists. The alarm box 50 receives the Wireless signals 44, processes and determines the information contained therein, and communicates that information to users locally via alarm box 50 and/or remotely, for example via the output receiving device 60.

It is also envisioned that alarm box 50 may include a microphone or similar device to "listen" for any audible tones generated directly by emitter 26. As such, a redundant system is established wherein in the event that the Wireless signal 44 is not received by the alarm box 50, alarm box 50 may still detect a potential theft condition based on the audible tone generated by emitter 26. This operation may be the same or similar to that as described in U.S. Pat. No. 8,803,687 to Valiulis et. al titled "Retail System Signal Receiver Unit For Recognizing a Preset Audible Alarm Tone," the teachings and disclosure of which are incorporated by reference herein in their entirety.

In one embodiment, the emitters 26 may include a speaker or speakers and are configured to emit audible signals. In other embodiments, where the merchandise tag 20 includes a miniature camera or GPS receiver, the emitters 26 may emit video signals or GPS data in addition to the audio signals. Additionally, the antenna 46 of merchandise tag 20 is configured to transmit an Wireless signal 44 to the alarm box 50 which includes information related to the merchandise product 22 to which the merchandise tag 20 is attached, or to a particular status of the merchandise product 22, or whether there is a normal condition that indicates a regular customer removal of the merchandise tag 20 from the merchandise product 22, as well as whether a potential theft condition exists to which store personnel should be alerted. The alarm box 50 then sends the signal 52, if appropriate, to the output receiving device 60 configured to alert store personnel to the potential theft condition. This arrangement may be effective in large retail environments where store personnel may be too far away to hear an audible signal, for example, or too far to see a possible visual indicator from the emitter 26 indicating a potential theft condition.

In a particular embodiment, the microprocessor 34 is configured to activate or deactivate the merchandise tag 20 when the light sensor 24 (see FIG. 2) detects a particular coded light sequence. In a retail environment, the user may control the merchandise tag 20 using a handheld strobe device 27 (also referred to as a portable strobe key) for activating or deactivating the merchandise tag 20. For example, the merchandise tag 20 may be configured to receive a signal including a deactivation code from a portable strobe key 27, such as that described in U.S. patent application Ser. No. 13/591,040, entitled "Theft Detection System", filed on Aug. 21, 2012 (and issued, as U.S. Pat. No. 8,884,761, to Valiulis), which is incorporated herein by reference in its entirety. In one embodiment, the light sensor 24 is configured to receive a pattern of flashing light (e.g., spatial patterns, series of flashes on and off from the portable strobe key 27). The microprocessor 34 then determines if the pattern received by the light sensor 24 is a valid activation or deactivation pattern depending on the circumstance (i.e., the pattern matches a pre-programmed activation or deactivation code). It is also contemplated that tag 20 could utilize multiple strobe keys 27 having differing codes. For example, one strobe key 27 could be utilized at a logistics center to temporarily put installed tags 20 into a sleep mode for transfer to a store. Once at the store, a second key having a different strobe pattern could be utilized to "wake" the tags 20 so that they can begin monitoring for potential theft events.

In an alternate embodiment, the microprocessor 34 is configured to deactivate the merchandise tag 20 based on signals received from an electronic activation/deactivation pad 27. In a retail environment, the user may control the merchandise tag 20 using the activation/deactivation pad 27 to activate or deactivate the merchandise tag 20. For example, in some embodiments, the merchandise tag 20 may be activated or deactivated merely by bringing the activation/deactivation pad 27 in close proximity to the merchandise tag 20. However, the activation/deactivation pad 27 may also be configured to set or adjust certain parameters of the merchandise tag 20 such as the pause time before arming, pause time after tag removal, or the maximum time the alarm sounds (to be discussed in more detail below).

The merchandise tag 20 may be controlled in a number of different ways. For example, the merchandise tag 20 may be coupled to a merchandise product 22 and activated. When a light sensor 24 of the merchandise tag 20 detects a light level below a predetermined light level and the motion sensor 36 of the merchandise tag 20 detects movement of the merchandise tag 20 for more than a predetermined alarm time period, without the light sensor 24 detecting a light level that is at or above the predetermined light level or the motion sensor 36 detecting that the merchandise tag 20 is no longer in motion for more than a preset interruption time, the controller 34 controls the emitter 26 to emit an alarm signal.

Figure 5:
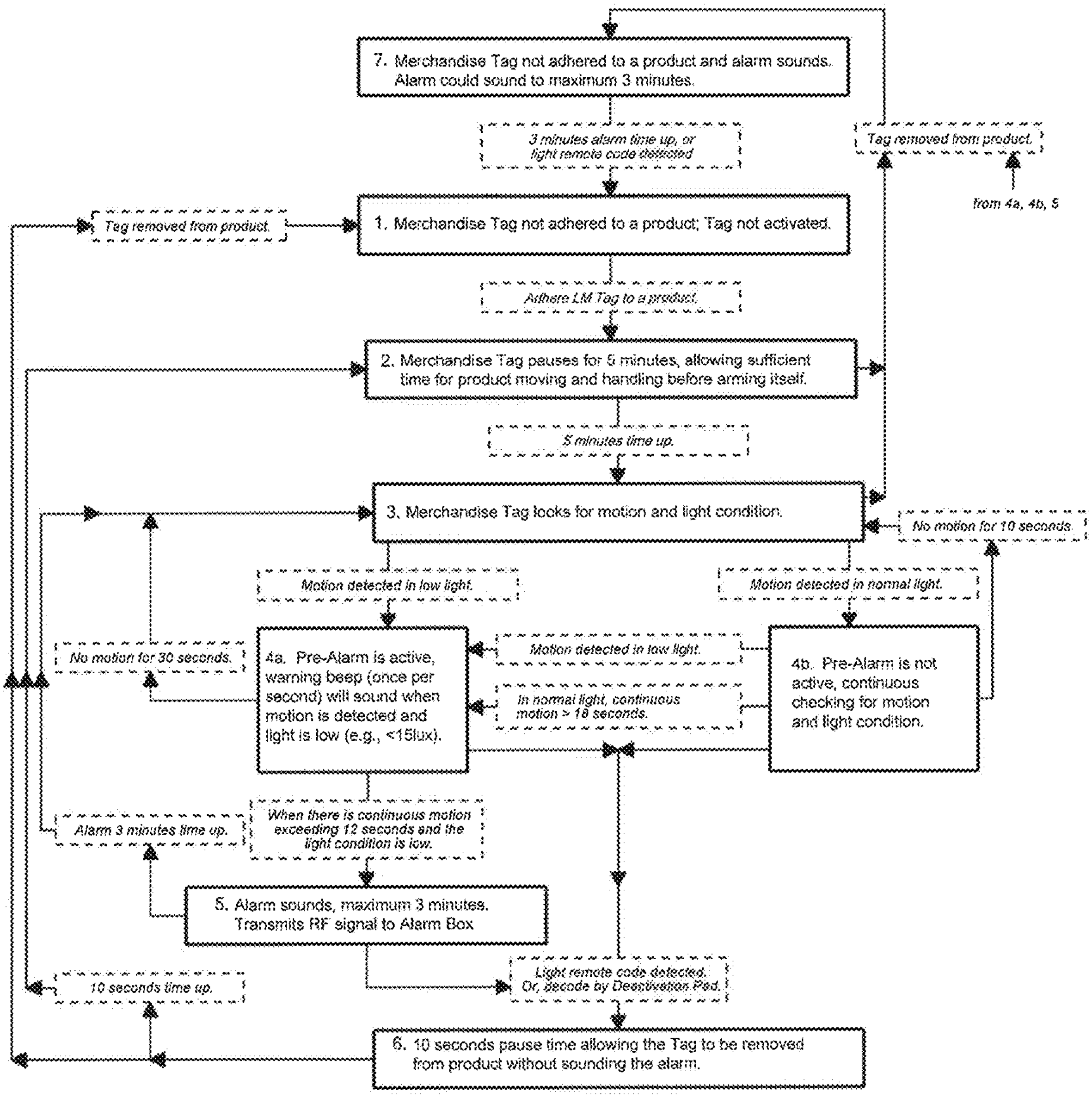
FIG. 5 is a flow diagram illustrating operation of the theft detection device, in accordance with embodiments of the invention.
Figure 6:
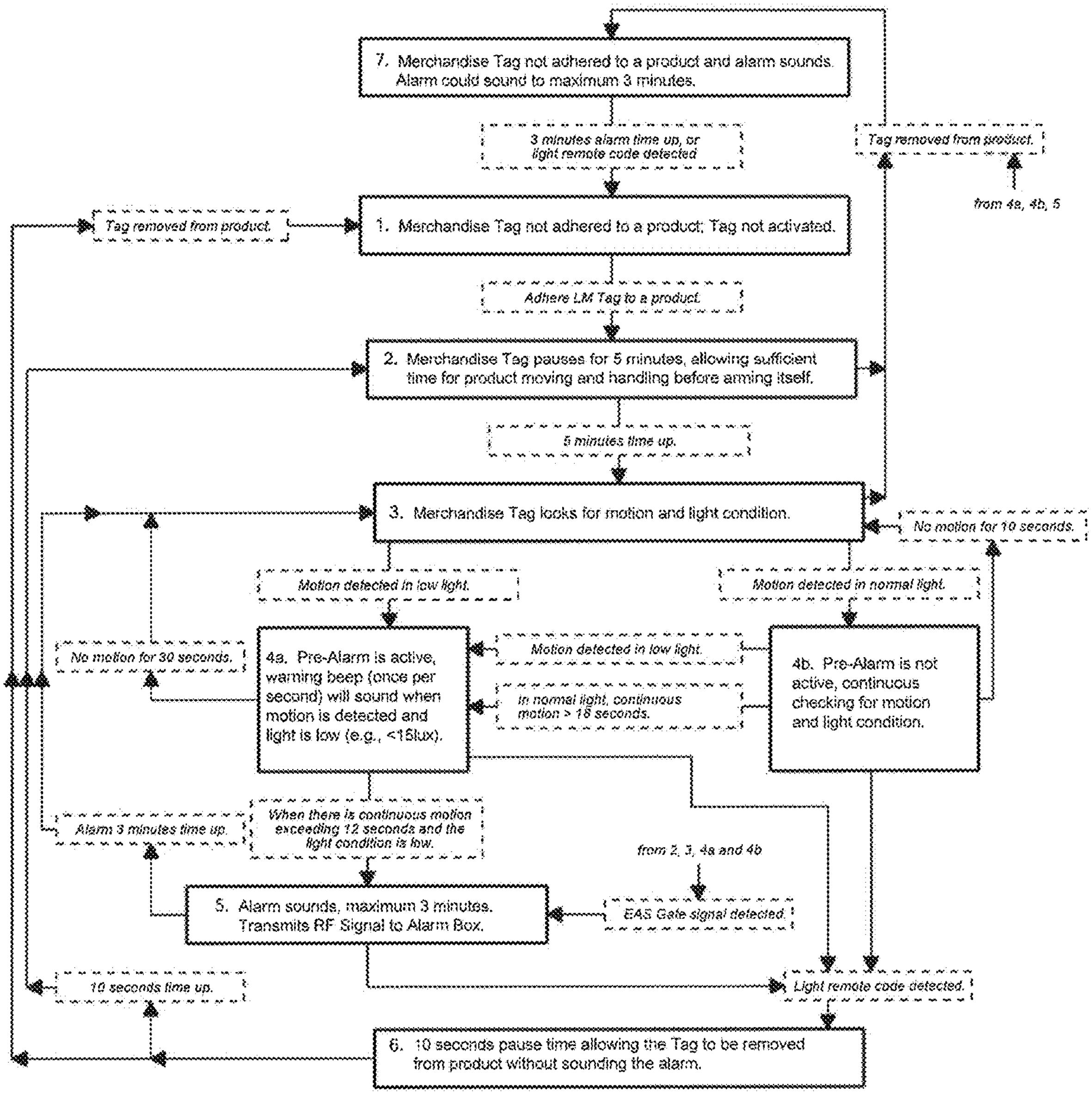
FIG. 6 is a flow diagram illustrating operation of the theft detection device, in accordance with embodiments of the invention.

FIGS. 5 and 6 are flow diagrams illustrating operation of the system described herein. In Step 1, the merchandise tag 20 is not adhered to a product, and the tag 20 is not activated. Before Step 2, the merchandise tag 20 is placed on a product and, in Step 2, the merchandise tag 20 pauses for a specified time to allow store personnel to move and place the product as desired before the merchandise tag 20 arms itself. In the embodiments of FIGS. 5 and 6, the specified time is five minutes, but this time could be longer or shorter than five minutes. In particular embodiments, the user may set or adjust the specified time using one of several means, including, but not limited to, a handheld strobe device 27, an activation/deactivation pad 27 (see FIG. 4), the alarm box 50 (see FIG. 1), and a computer or mobile electronic device configured to communicate with the merchandise tag 20.

Once the pause time has elapsed, Step 3 commences in which the merchandise tag 20 is armed and monitoring the motion and light condition. If the merchandise tag 20 detects both motion and a low-light condition, the process moves to Step 4*a* in which the merchandise tag 20 is in Pre-Alarm mode. In this mode, a warning beep sounds, for example once per second. In such a case, a low-light condition may be defined as a light level below 15 lux, for example, or some other suitable threshold. While the merchandise tag 20 is in Pre-Alarm mode, if the detected motion continues for longer than a threshold time period (12 seconds in the embodiments of FIGS. 5 and 6), the merchandise tag 20 goes into Alarm mode which includes an audible alarm and/or transmission of a wireless signal to the alarm box 50. In some embodiments, the Alarm mode is limited to some maximum time period (3 minutes in the embodiments of FIGS. 5 and 6).

If the merchandise tag 20 stays in Alarm mode for the maximum time period, when the maximum time period elapses, the merchandise tag 20 reverts back to Step 3 in which the merchandise tag 20 monitors motion and the light condition. If during Step 5, a deactivation code is supplied by a handheld strobe device 27 or activation/deactivation pad 27, the merchandise tag 20 proceeds to Step 6 in which the merchandise tag 20 pauses for a specified time period (10 seconds in the embodiments of FIGS. 5 and 6) to allow for removal of the merchandise tag 20 from the merchandise product 22. If the merchandise tag 20 is not removed after the specified time period, the retail merchandise tag reverts to Step 2 and repeats the functionality described above. If the merchandise tag 20 is removed, however, the merchandise tag 20 goes into a deactivated state as is shown in Step 1.

The operation shown in FIGS. 5 and 6 also provides for the instance that the retail merchandise tag 20 is removed entirely from a product after being armed at Step 3. Indeed, if the retail merchandise tag 20 is removed after Step 3 (or Steps 4*a*, 4*b*, or 5) the retail merchandise tag 20 emits an alarm locally as described above and/or transmits a wireless signal to the alarm box 50 as is shown in Step 7 in an Alarm mode.

Alternatively, after Step 3 if motion is detected, but no light condition is detected, i.e., retail merchandise tag 20 remains in normal light, Step 4*b* is implemented where a continuous monitoring of the motion of merchandise tag 20 and the light condition is conducted. If the motion persists for more than a predetermined time period (e.g., 18 seconds in the illustrated embodiment) but the light condition remains unchanged, or if the light condition changes to the low light condition in less than the aforementioned predetermined time period, Step 4*b* is implemented. If, however, the motion does not continue for the aforementioned predetermined time period or if the light condition does not change, and there is no motion for 10 seconds, retail merchandise tag 20 reverts to Step 3.

FIG. 6 is a flow diagram illustrating operation of the system which is the same as that describe above relative to FIG. 5, except that the merchandise tag 20 is also configured to generate an alarm when it detects an EAS (electronic article surveillance) gate, such as the familiar gates seen at the entry/exits of contemporary retail establishments. The system operates in the same manner as that described above relative to FIG. 5 except that during or after any one of Steps 2, 3, 4*a*, or 4*b*, the merchandise tag 20 detects, or is detected by, an EAS gate, it will issue the alarm as described above.

Figure 7A:
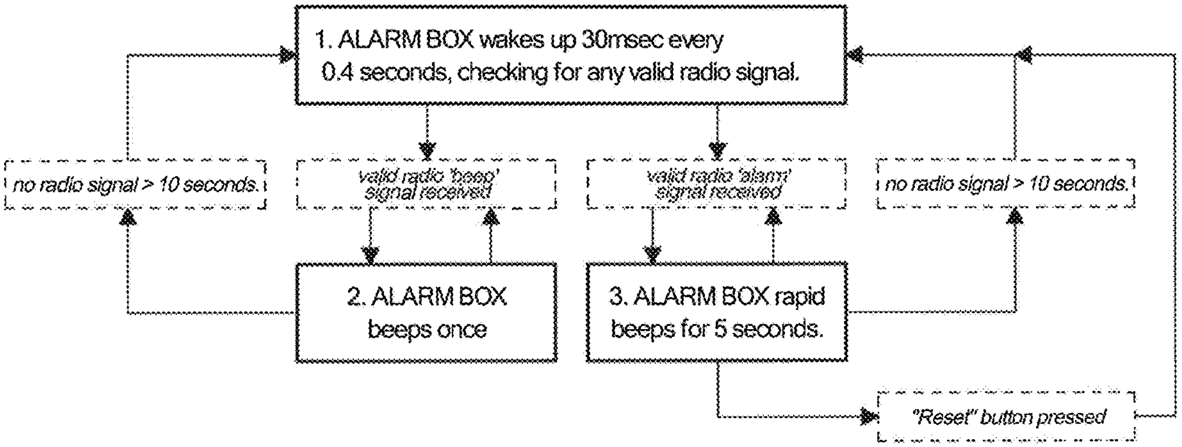
FIGS. 7A and 7B are flow diagrams illustrating operation of the alarm box, in accordance with embodiments of the invention.

With reference to FIG. 7A, a flow diagram is illustrated that describes operation of the alarm box 50 when the mode switching button 108 (shown in FIG. 9) is in position "B", which in this case indicates that the alarm box 50 is in "Beep Mode". In this mode, the alarm box 50 periodically checks for a valid Wireless signal from one or more merchandise tags 20. In the embodiment shown, the alarm box 50 checks for this Wireless signal for 30 milliseconds every four tenths of a second. If the Wireless signal indicates a normal merchandise removal, the alarm box 50 may provide an audible, or some other suitable signal, indicative of the normal merchandise removal. If the Wireless signal indicates an alert mode due to a possible theft, the alarm box 50 may provide an audible, or some other suitable signal, indicative of the alert mode. The alarm box 50 and its operation is also described in U.S. patent application Ser. No. 15/627,033, entitled "Retail Merchandise Hook With Radio Transmission", filed on Jun. 19, 2017, which is incorporated herein by reference in its entirety.

Figure 7B:
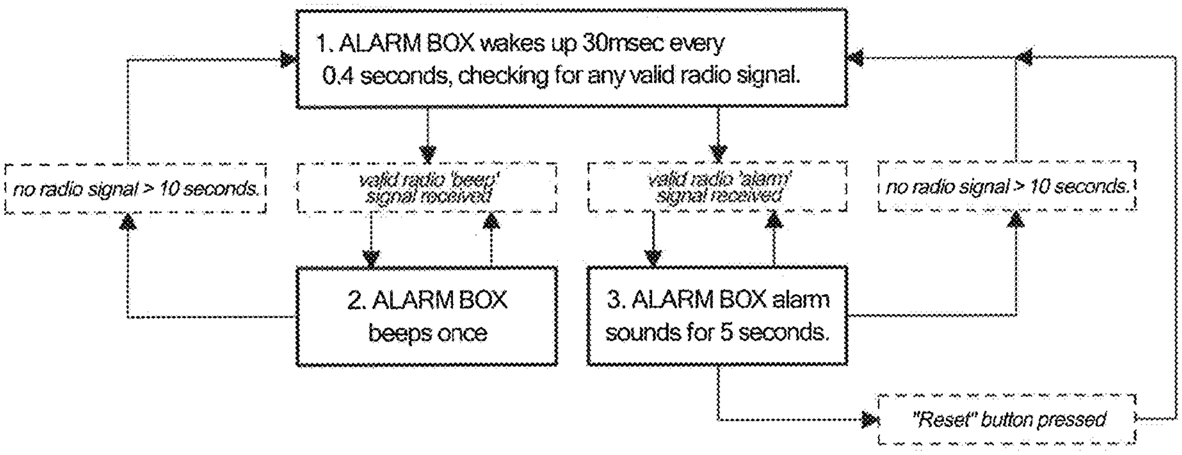

With reference to FIG. 7B, a flow diagram is illustrated that describes operation of the alarm box 50 when the mode switching button 108 (shown in FIG. 9) is in position "A", which in this case indicates that the alarm box 50 is in "Alarm Mode". In this mode, the alarm box 50 periodically checks for a valid Wireless signal from one or more merchandise tags 20. In the embodiment shown, the alarm box 50 checks for this Wireless signal for 30 milliseconds every four tenths of a second. If the Wireless signal indicates a normal merchandise removal the alarm box 50 may provide an audible, or some other suitable signal, indicative of the normal merchandise removal. If the Wireless signal indicates an alert mode due to a possible theft, the alarm box 50 may provide an audible, or some other suitable signal, indicative of the alert mode.

Figure 8:
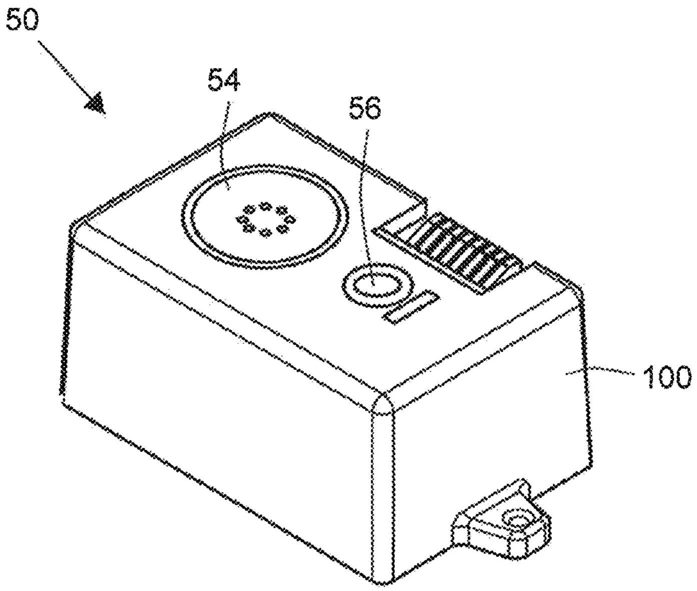
FIGS. 8 and 9 are perspective and side views, respectively, of an alarm box, constructed in accordance with an embodiment of the invention.
Figure 9:
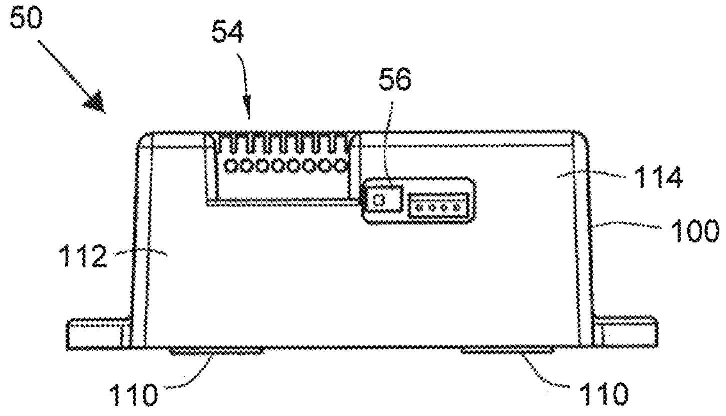

FIGS. 8 and 9 are perspective and side views, respectively, of the alarm box 50, constructed in accordance with an embodiment of the invention. As shown, the alarm box 50 has a housing 100. In the embodiment of FIG. 8, the alarm box 50 has a speaker 102 and a reset button 104 on a top side of the housing 100. When pressed, the reset button 104 turn off an alarm being sounded by the alarm box 50. In particular embodiments, the user may select from a number of different alarm sounds.

The plan view of FIG. 9 shows a plurality of terminals 106, which allow for connection of the alarm box 50 to any number of output receiving devices 60 (see FIG. 1), including, but not limited to, a computer, a pager, a cellular telephone, a public address system, computer memory, one or more video cameras, and video monitors. The signal (e.g., an alarm signal indicating a potential theft) from the alarm box 50 may be used to activate or control the output receiving device 60.

The alarm box 50 may further include control circuitry 114 configured to transmit a control signal used to activate or control the output receiving device 60. In particular embodiments, the control circuitry 114 is also configured to that causes the emitter to emit a first audible signal when a first wireless signal from the one or more signal-emitting retail display devices indicates no-theft condition, and to emit a second audible signal, different from the first audible signal, when a second wireless signal from the one or more signal-emitting retail display devices indicates a theft condition. The control circuitry may also cause the emitter to emit the second audible signal when the first wireless signal is absent for a threshold amount of time.

In FIG. 9, a mode switching button 108 is shown adjacent to the plurality of terminals 106. The mode switching button 108 may be designed to switch between a beep mode and an alarm mode, as described above. In certain embodiments, the housing 100 has one or more magnets 110 attached to facilitate mounting of the alarm box 50 to a metal surface. Like the merchandise tag 20 (shown in FIG. 2) described above, the alarm box 50 may be battery-operated. Due to low power requirements, the alarm box 50 can be expected to operate for many months before needing to replace the batteries. However, it is envisioned that the alarm box 50 may also be constructed, e.g., with an electrical plug, to operate using externally-provided power.

As referenced above, the alarm box 50 may have an internal antenna that is part of a receiver 112, such that the alarm box 50 is configured to receive wireless signals from one or more merchandise tags 20 (shown in FIG. 2). In certain embodiments, the alarm box 50 is also configured to emit a variety of different audio signals which may be indicative of, for example, a location of the merchandise tag 20, the type of merchandise displayed on the merchandise tag 20, and the likelihood of an attempted theft. The alarm box 50 may be configured to recognize one or more merchandise tags 20 each having a particular and unique identification code. For example, the alarm box 50 may recognize only those merchandise tags 20 having a first identification code, while ignoring signals from merchandise tags 20 having a different identification code.

Thus, a retail operation may employ several alarm boxes 50, each recognizing a different identification code, and thus each recognizing the signal from a different group of merchandise tags 20 (see FIG. 2). This allows the retail operator to segregate or distinguish various retail items by using merchandise tags 20 and alarm boxes 50 with specific identification codes that correspond with a particular type of retail item, or a specific location within the retail establishment. The alarm boxes 50 may be paired with merchandise tags 20 having specific identification codes such that the warning beeps and alarm signals are synchronized. In a particular embodiment, the alarm box 50 is configured to recognize up to 256 unique identification codes, and the merchandise tags 20 can be configured to emit signals with 256 unique identification codes. While not explicitly shown in FIGS. 8 and 9, one of ordinary skill in the art will recognize that the alarm box could also be constructed with a visual display to identify the 256 unique identification codes. However, this information could also be transmitted from the alarm box 50 to the output receiving device 60 and displayed on that device 60.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A theft detection device, comprising:

a light sensor;

a motion sensor;

an emitter configured to emit an audible or visual signal;

an antenna located separately from the emitter and configured to emit a wireless signal;

a controller;

wherein the controller is configured to determine a light level sensed by the light sensor;

wherein the controller is configured to determine, via the motion sensor, whether the theft detection device is in motion;

wherein the controller is configured to operate the antenna based on the sensed motion of the theft detection device and the light level sensed by the light sensor such that the wireless signal is transmitted by the antenna to an alarm box; wherein the alarm box is located remotely from the theft detection device; and wherein the controller is further configured to determine whether the theft detection device is in motion, wherein if the theft detection device is in motion for a period of time longer than a threshold time period, the controller simultaneously i) operates the antenna to transmit the wireless signal, and ii) operates the emitter to emit the audible tone or the visual signal;

wherein the wireless signal is: iii) indicative of a potential theft condition, iv) transmitted independently from the audible tone or the visual signal and v) of a different type from the audible tone or the visual signal.

2. The theft detection device of claim 1, wherein the controller is configured to operate the emitter based on the sensed motion of the theft detection device and the light level sensed by the light sensor such that a signal is generated by the emitter.

3. The theft detection device of claim 2, wherein the signal generated by the emitter is an audible tone.

4. The theft detection device of claim 3, wherein the controller is configured to operate the emitter and the antenna based on the sensed motion of the theft detection device and the light level sensed by the light sensor such that the signal is generated by the emitter and the wireless signal are transmitted by the antenna to the alarm box simultaneously.

5. The theft detection device of claim 1, wherein the controller is configured to recognize a signal from an electronic article surveillance (EAS) gate.

6. The theft detection device of claim 5, wherein the controller is configured to operate at least one of the emitter to generate the signal and the antenna to generate the wireless signal upon receiving the signal from the EAS gate.

7. The theft detection device of claim 5, wherein the controller is configured to recognize a signal from an activation/deactivation pad.

8. The theft detection device of claim 7, wherein the activation/deactivation pad comprises a portable strobe key or a handheld strobe device.

9. The theft detection device of claim 8, wherein the controller is configured to recognize, via the light sensor, multiple strobe patterns from the portable strobe key or handheld strobe device, and to implement multiple activation/deactivation modes based on the strobe pattern detected.

10. The theft detection device of claim 7, wherein the controller is configured to operate at least one of the emitter to discontinue producing the signal and the antenna to discontinue producing the wireless signal.

11. A theft detection system, comprising:

at least one retail merchandise tag configured to attach to an item of retail merchandise, the at least one retail merchandise tag configured to i) detect a change in motion of the at least retail merchandise tag sensed by a motion sensor of the at least one retail merchandise tag, and ii) a change in light sensed via a light sensor of the at least one retail merchandise tag which together i) and ii) are indicative of a potential retail theft condition, the at least one retail merchandise tag having a controller, the controller configured to determine whether the at least one retail merchandise tag is in motion, wherein if the at least one retail merchandise tag is in motion for a period of time longer than a threshold time period, the controller simultaneously iii) operates the at least one retail merchandise tag to transmit a wireless radio signal, and iv) operates an emitter, located in the at least one retail merchandise tag, to transmit an audible tone or a visual signal:

wherein the wireless radio signal is: v) indicative of the potential theft condition; vi) transmitted by an antenna, of the at least one retail merchandise tag, located separately from the emitter, vii) transmitted independently from the audible tone or the visual signal and viii) of a different type from the audible tone or the visual signal:

an alarm box located remotely from the at least one retail merchandise tag, the alarm box configured to receive the wireless radio signal and the audible tone; and wherein the at least one retail merchandise tag and the alarm box are each operable to generate an alarm upon detection of the potential retail theft condition simultaneously.

12. The system of claim 11, wherein the signal includes a signal produced by an emitter of the retail merchandise tag and the wireless signal produced by the antenna.

13. The system of claim 12, wherein the at least one retail merchandise tag includes a controller that is configured to operate the emitter and the antenna based on the sensed motion of the at least one retail merchandise tag and a light level sensed by the light sensor such that a signal is generated by the emitter.

14. The system of claim 13, wherein the signal generated by the emitter is an audible tone.

15. The system of claim 13, wherein the controller is configured to recognize a signal from an electronic article surveillance (EAS) gate.

16. The system of claim 15, wherein the controller is configured to operate at least one of the emitter to generate the signal and the antenna to generate the wireless signal upon receiving the signal from the EAS gate.

17. The system of claim 13, wherein the controller is configured to recognize a signal from an activation/deactivation pad.

18. The system of claim 17, wherein the activation/deactivation pad comprises a portable strobe key or a handheld strobe device.

19. The system of claim 18, wherein the controller is configured to recognize, via the light sensor, multiple strobe patterns from the portable strobe key or handheld strobe device, and to implement multiple activation/deactivation modes based on the strobe pattern detected.

20. The system of claim 17, wherein the controller is configured to operate at least one of the emitter to discontinue producing the signal and the antenna to discontinue producing the wireless signal.

21. The system of claim 11, further comprising a signal relay device configured to receive the wireless radio signal from the at least one retail merchandise tag and to relay that wireless radio signal to the alarm box.

22. A method of detecting a potential retail theft and generating an alarm, the method comprising:

attaching a retail merchandise tag to an item of retail merchandise;

detecting motion of the retail merchandise tag using a motion sensor of the retail merchandise tag;

detecting a light condition using a light sensor of the retail merchandise tag;

determining whether the motion of the retail merchandise tag is indicative of the potential retail theft using a microprocessor of the retail merchandise tag, the microprocessor coupled to the motion sensor, wherein the determining whether the motion is indicative of the potential theft comprises determining whether the retail merchandise tag is in motion, wherein if the retail merchandise tag is in motion for a period of time longer than a threshold period of time, the microprocessor operates the retail merchandise tag i) to simultaneously transmit a wireless radio signal, and ii) to transmit, via an emitter located in the retail merchandise tag, an audible tone or a visual signal; and wherein the wireless radio signal is: iii) indicative of the potential retail theft; iv) transmitted by an antenna, of the retail merchandise tag, located separately from the emitter, v) transmitted independently from the audible tone or the visual signal and vi) of a different type from the audible tone or the visual signal:

upon determination that the motion of the retail merchandise tag is indicative of the potential retail theft, generating an alarm both at an alarm box remote from the retail merchandise tag, and via the emitter.

23. The method of claim 22, further comprising generating an alarm locally at the retail merchandise tag via an emitter of the retail merchandise tag.

24. The method of claim 23, wherein the alarm generated locally at the retail merchandise tag and remotely at the alarm box are generated simultaneously.

25. The method of claim 22, further comprising activating or deactivating the retail merchandise tag using an activation/deactivation pad.

26. The method of claim 25, wherein comprising activating or deactivating the retail merchandise tag using an activation/deactivation pad comprises comprising activating or deactivating the retail merchandise tag using a portable strobe key or a handheld strobe device.

27. The method of claim 22, further comprising, upon determination that the motion of the retail merchandise tag is indicative of the potential retail theft, transmitting a wireless radio signal generated by an antenna of the retail merchandise tag to an alarm box remotely from the retail merchandise tag, and generating an alarm at the alarm box.

28. The method of claim 27, wherein transmitting the wireless radio signal generated by the antenna of the retail merchandise tag to the alarm box comprises transmitting the wireless radio signal to the alarm box via a signal relay device.

* * * * *